United States Patent
Suzuki

(10) Patent No.: US 10,250,544 B2
(45) Date of Patent: Apr. 2, 2019

(54) ELECTRONIC EQUIPMENT, SYSTEM INCLUDING ELECTRONIC EQUIPMENT AND MANAGEMENT DEVICE, AND METHOD EXECUTED BY ELECTRONIC EQUIPMENT

(71) Applicant: SEIKO EPSON CORPORATION, Tokyo (JP)

(72) Inventor: Hiroyuki Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 15/373,268

(22) Filed: Dec. 8, 2016

(65) Prior Publication Data

US 2017/0171133 A1 Jun. 15, 2017

(30) Foreign Application Priority Data

Dec. 10, 2015 (JP) ................... 2015-240844

(51) Int. Cl.
*G06F 15/16* (2006.01)
*H04L 12/58* (2006.01)
*H04L 29/08* (2006.01)

(52) U.S. Cl.
CPC ............. *H04L 51/22* (2013.01); *H04L 51/04* (2013.01); *H04L 51/18* (2013.01); *H04L 51/28* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2004/0143651 A1* | 7/2004 | Allen | ...................... | H04L 29/06 709/221 |
| 2006/0112174 A1* | 5/2006 | L'Heureux | ......... | H04L 67/2804 709/223 |
| 2007/0216941 A1* | 9/2007 | Jingu | .................... | G06F 3/1222 358/1.15 |
| 2012/0166564 A1* | 6/2012 | Yoshida | ............... | G06Q 10/107 709/206 |
| 2014/0068355 A1 | 3/2014 | Yoshida et al. | | |
| 2014/0226576 A1* | 8/2014 | Gupta | .................. | H04W 56/00 370/329 |
| 2015/0236916 A1* | 8/2015 | Spurlock | ............. | G06F 11/1464 709/203 |

FOREIGN PATENT DOCUMENTS

| | | | | | |
|---|---|---|---|---|---|
| AU | 200720198082 | * | 5/2007 | ............. | H04L 12/54 |
| JP | WO2002073421 A1 | * | 3/2001 | ............. | G06F 13/00 |
| JP | 2001-142803 | | 5/2001 | | |
| JP | 2003115879 A | * | 4/2003 | ............. | H04L 12/58 |
| JP | 2006-331436 | | 12/2006 | | |
| KR | 20080033052 A | * | 4/2008 | ............. | H04L 67/02 |

* cited by examiner

*Primary Examiner* — Phyllis A Book
(74) *Attorney, Agent, or Firm* — Workman Nydegger

(57) ABSTRACT

There is provided electronic equipment including: an instruction receiving unit that receives an instruction of a setting modification regarding the electronic equipment; and an electronic mail sending unit that sends an electronic mail including access information on a web page for permission of the setting modification by the modification instruction to a mail address corresponding to a predetermined administrator in a case of receiving the modification instruction. The electronic equipment further includes: a setting modification unit that modifies the setting according to the modification instruction based on the access to the web page.

9 Claims, 4 Drawing Sheets

ELECTRONIC EQUIPMENT, SYSTEM INCLUDING ELECTRONIC EQUIPMENT AND MANAGEMENT DEVICE, AND METHOD EXECUTED BY ELECTRONIC EQUIPMENT

BACKGROUND

1. Technical Field

The present invention relates to electronic equipment, a system including electronic equipment, and a method executed by electronic equipment.

This application claims priority to Japanese Application No. 2015-240844, filed Dec. 10, 2015, the entirety of which is incorporated by reference herein.

2. Related Art

There is a printer that receives a user's operation and modifies a current setting regarding a predetermined parameter.

A printer, which sends a mail for an administrator having URL which links a control page for operation of the printer to a mail address of the administrator if an error occurs, has been known (see JP-A-2006-331436). In addition, an MFP, which notifies of a predetermined situation or error by sending an electronic mail to an electronic mail address which is previously set in a case where the predetermined situation or error occurs, has been known (see JP-A-2001-142803).

In the related art, when the printer performs the setting modification described above, a completion of modification has been notified to the administrator who manages the printer. In this way, when the administrator who receives a posterior report of the setting modification can not permit the setting modification from a viewpoint of security or the like, it is necessary to make the user modify the setting again. Neither of JP-A-2006-331436 nor JP-A-2001-142803 solves a complication due to such a posterior report of the setting modification.

SUMMARY

An advantage of some aspects of the invention is to provide a technology which contributes to safe performance of the setting modification of the electronic equipment and avoidance of the complication.

According to one aspect of the invention, there is provided electronic equipment including: an instruction receiving unit that receives an instruction of a setting modification regarding the electronic equipment; and an electronic mail sending unit that sends an electronic mail including access information on a web page for permission of the setting modification by the modification instruction to a mail address corresponding to a predetermined administrator in a case of receiving the modification instruction.

According to this configuration, the electronic equipment sends the electronic mail including the access information on the web page to the mail address corresponding to the administrator when the instruction of the setting modification is received. With this, the administrator can express his intention using the access to the web page to permit the setting modification by the instruction of the modification and the electronic equipment can avoid performing of the setting modification before obtaining the permission. As a result, security of the electronic equipment is kept and the complication described above does not occur.

According to one aspect of the invention, the electronic equipment may further include: a setting modification unit that modifies the setting according to the modification instruction based on the access to the web page. According to this configuration, the setting modification can be performed based on the access to the web page, that is, by receiving permission of the administrator.

According to one aspect of the invention, the setting modification unit may maintain the setting in a case where a notification that the setting modification is not permitted is obtained by the access to the web page. According to this configuration, it is possible not to perform the setting modification (maintain the setting) by receiving clear intention of the administrator who does not permit the setting modification.

According to one aspect of the invention, the setting modification unit may maintain the setting in a case where there is no access to the web page within a predetermined period of time after the electronic mail sending unit sends the electronic mail. According to this configuration, it is possible not to perform the setting modification (maintain the setting) by receiving a fact that there is no access to the web page within the predetermined period of time.

According to one aspect of the invention, after the notification that the setting modification is not permitted is received, the electronic mail sending unit may delete the modification which is not permitted by the notification from a list of modifications to be permitted when sending the electronic mail in response to receiving of the modification instruction. According to this configuration, in a case where the administrator precisely rejects permission of the setting modification, thereafter, unnecessary processing such as repeated request for permission through the electronic mail can be eliminated.

According to one aspect of the invention, the electronic equipment may further include an output unit that outputs a result of the setting modification by the setting modification unit to outside. According to this configuration, it is possible to present to the user the result of the setting modification executed after permission of the administrator.

According to one aspect of the invention, the electronic equipment may further include: a web server that provides the web page. According to this configuration, since the electronic equipment functions as the web server which provides the web page, it is possible to easily and reliably recognize the access to the web page.

A technical idea of the invention can also be realized by other than the electronic device. For example, a system including electronic equipment and a management device for managing electronic equipment, the electronic equipment includes: an instruction receiving unit that receives an instruction of a setting modification regarding the electronic equipment; and an electronic mail sending unit that sends an electronic mail including access information on a web page for permission of the setting modification by the modification instruction to a mail address corresponding to a predetermined administrator in a case of receiving the modification instruction, and the management device includes: an electronic mail receiving unit that receives the electronic mail; and a control unit that accesses the web page based on the access information included in the electronic mail. This configuration can be one aspect of the invention.

In addition, a method including each step executed by each unit of the electronic device can be regarded as the invention or a method including each step executed by each unit of the management device can be regarded as the invention. An invention of a program for causing a computer to execute such a method or a computer readable storage medium storing a program also can be regarded as one invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
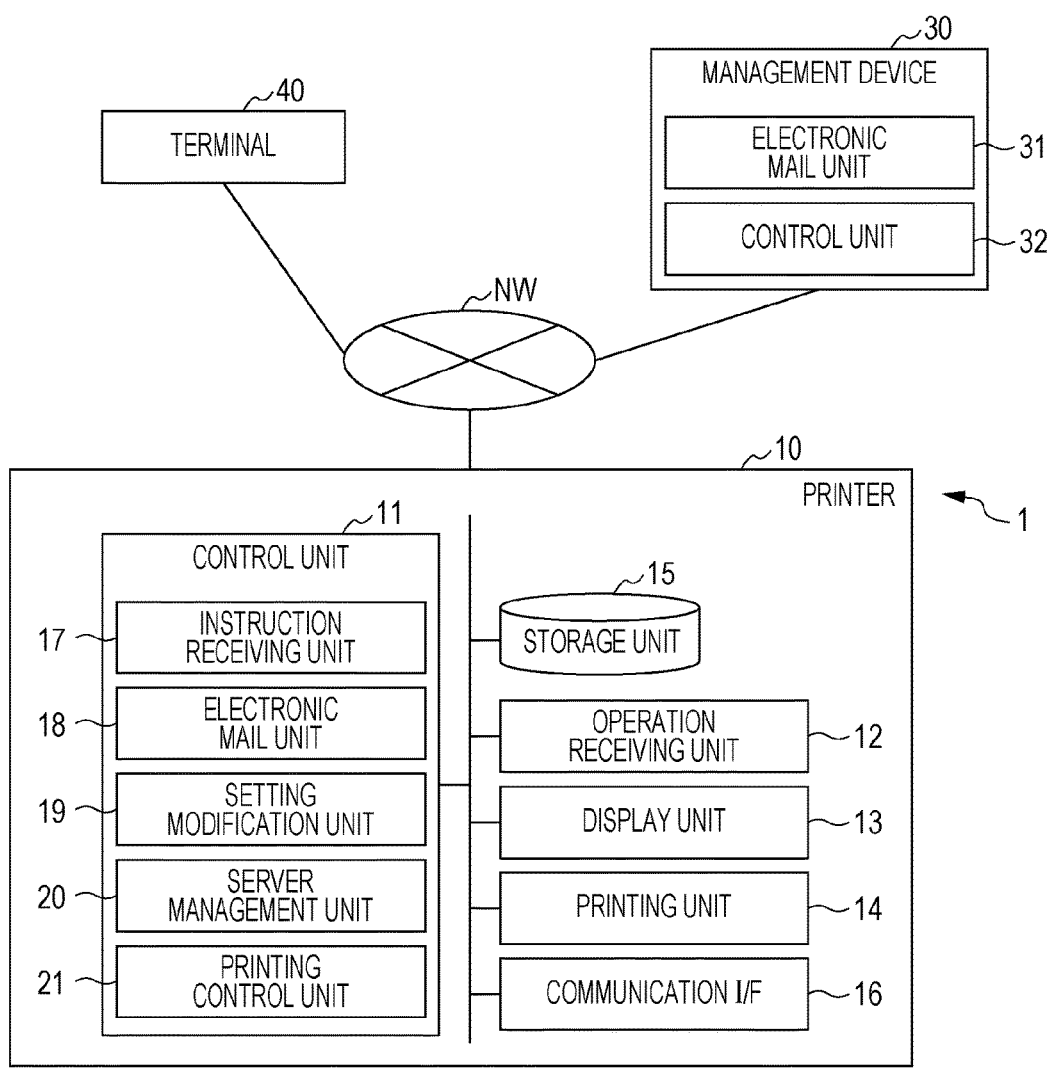
FIG. 1 is a block diagram schematically illustrating a configuration of a system according to an embodiment.

Hereinafter, an embodiment of the invention will be described with reference to respective drawings. Furthermore, each of the drawings is merely an example for an explanation of the present embodiment. FIG. 1 schematically shows a system 1 according to the embodiment of the invention. The system 1 includes a printer 10 and a management device 30 in an example of FIG. 1. The system 1 may further include a terminal 40. The printer 10 is a specific example of electronic equipment according to the invention. The electronic equipment may be equipment which can perform a setting or modify the setting for various parameters which are necessary for an operation of the equipment. Therefore, the electronic equipment according to the invention is not limited to the printer and is applied to various products such as a scanner, a copy machine, a facsimile machine, a projector, and the like, for example.

The printer 10 is connected to the network NW and can communicate with a communication destination via the network NW. The network NW is built by an internet or local area network (LAN) or mobile telephone network or the like. The network NW can be wired or wireless. The management device 30 or the terminal 40 can be various terminals such as a personal computer (PC), a mobile telephone, a smart phone, a tablet-type terminal, or the like having a communication function via the network NW.

FIG. 1 shows the printer 10 as a configuration including a control unit 11, an operation receiving unit 12, a display unit 13, a printing unit 14, a storage unit 15, a communication interface (I/F) 16, and the like. The control unit 11 is configured to include, for example, an IC or other storage media having CPU or ROM or RAM or the like. In the control unit 11, the CPU functions as an instruction receiving unit 17, an electronic mail unit 18, a setting modification unit 19, a server management unit 20, a printing control unit 21, and the like and controls each of the configurations of the printer 10 by performing a process according to a program (firmware) or an application stored in ROM or other storage medium. The storage unit 15 is one type of the storage medium included in the printer 10. The storage unit 15 may be a part of the control unit 11.

The operation receiving unit 12 is to receive an operation from a user and includes various buttons or switches or the like. The display unit 13 is means for displaying various information regarding the printer 10 and is configured to include, for example, a liquid crystal display (LCD). The display unit 13 may function as a so-called touch panel. It can be said that the display unit 13 is served as the operation receiving unit 12 in a case of functioning as the touch panel.

The printing unit 14 is equipment which can perform a printing on a medium to be printed based on a printing job sent from outside. Printing methods which can be employed by the printing unit 14 are various such as an ink jet type or a laser type or the like. Although not shown in the drawings, the printer 10 is configured to include, for example, a scanner and may function as a multifunction printer. The communication I/F 16 is a generic term for I/Fs connected to the network NW according to a predetermined communication protocol.

The printer 10, the management device 30, and the terminal 40 are equipment respectively operated by a user, however for convenience the user who operates the management device 30 is called an administrator. If the management device 30 is simply called a user, it means that it includes users who are administrators or not administrators. In the present embodiment, the administrator is in a position to permit a modification of a setting regarding the electronic device to be managed. In a case where the electronic equipment is the printer 10, examples of settings regarding the printer 10 extend into many fields such as a setting of a source of media to be printed (paper tray), a setting of an administrator password, a network setting, a setting of an ink or a toner to be used, a setting of a paper size, a setting of print quality, and the like. The administrator password is a password required to be input when the user uses the printer 10. In the following, such a setting regarding the printer 10 is simply referred to as a setting or setting information.

Example 1

Figure 2:
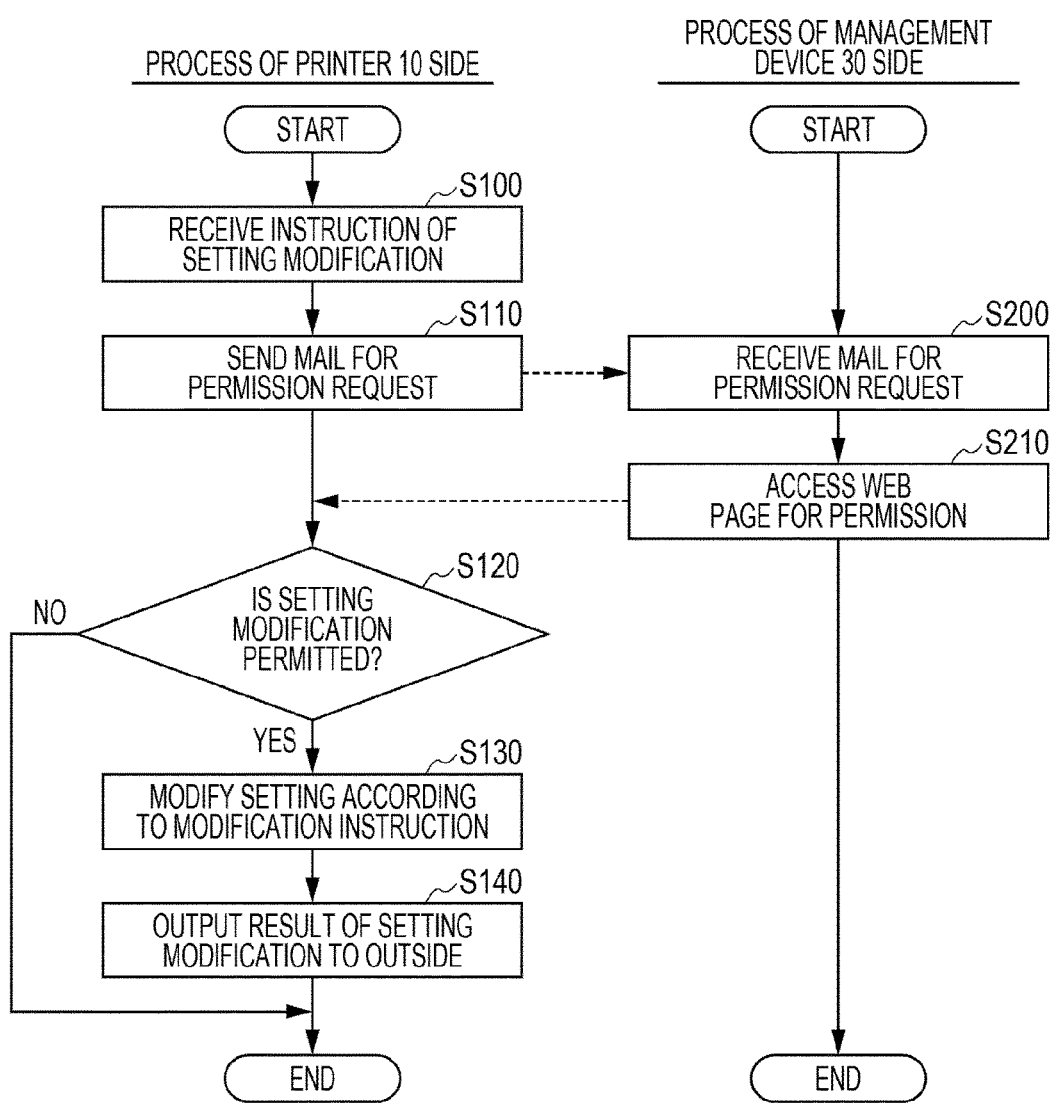
FIG. 2 is a flowchart showing a setting modification process according to Example 1.

FIG. 2 shows a setting modification process according to the embodiment as a flowchart. The process shown in FIG. 2 is referred to as Example 1. FIG. 2 shows a process executed by the print 10 and a process executed by the management device 30 in parallel. In step S100, the printer 10 receives an instruction of the setting modification. Specifically, the user instructs of the modification with respect to a current setting to the printer 10 by arbitrarily operating the operation receiving unit 12. The instruction receiving unit 17 receives the instruction (modification instruction) in response to such an operation through the operation receiving unit 12. In step S100, the modification instruction is merely received and the current setting is not modified according to the modification instruction. The current setting is stored in, for example, the storage unit 15. Step S100 corresponds to an instruction receiving step.

In step S110, the electronic mail unit 18 sends an electronic mail to a mail address corresponding to the predetermined administrator (administrator according to the management device 30). That is, with receiving of the modification instruction in step S100 as a trigger, the electronic mail unit 18 is activated, generates necessary electronic mail, and sends the electronic mail to the mail address for the administrator. The electronic mail unit 18 is capable of executing sending and receiving of the electronic mail, and corresponds to an electronic mail sending unit. Step S110 corresponds to an electronic mail sending step. The electronic mail sent by the electronic mail unit 18 includes access information of a web page for permission of the setting modification by the modification instruction. In the following, such a web page is referred to as a web page for permission and the electronic mail sent in step S110 is referred to as a mail for permission request.

In step S200, the management device 30 receives the mail for permission request from the printer 10. That is, the administrator operates the management device 30, thereafter a mailer (electronic mail unit 31) on which the management device 30 is mounted is activated, and an electronic mail unit 31 receives the mail for permission request sent to the address for the administrator. The electronic mail unit 31 is capable of executing sending and receiving of the electronic mail, and corresponds to an electronic mail receiving unit.

Figure 3:
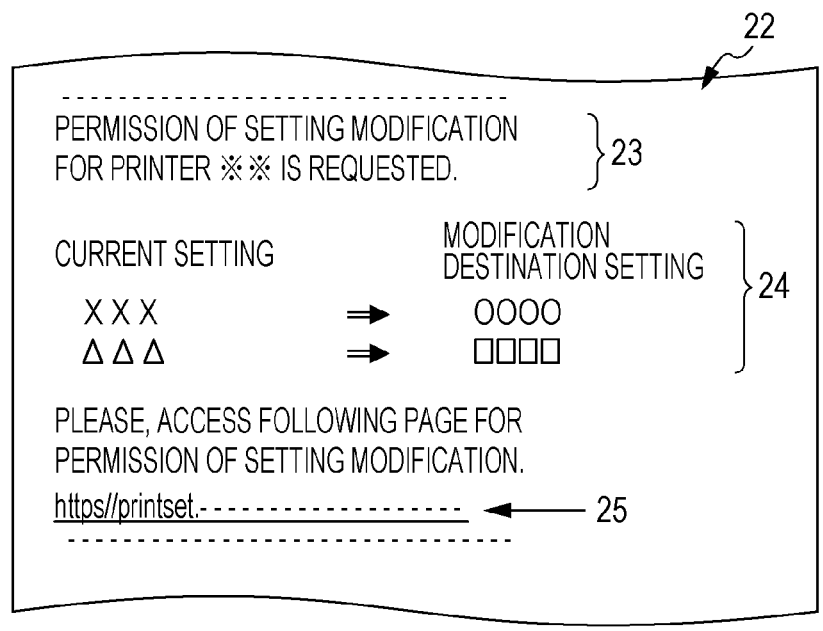
FIG. 3 is a diagram illustrating a part of sentences of a mail for permission request.

FIG. 3 illustrates a part of sentences of a permission request mail 22 sent by the printer 10. The permission request mail 22 includes, for example, a message 23 indicating that the mail is for request of permission of the setting modification of the printer 10, a document 24 indicating a current setting and a setting of a modification destination of which permission is requested, an URL 25 as the access information, and the like. It is a matter of course that the permission request mail 22 includes information specifying a sender of the mail (name of printer 10, IP address of printer 10, user name, and the like).

In step S210, the control unit 32 of the management device 30 accesses the web page for permission based on the access information included in the permission request mail. For example, the administrator clicks or taps the URL 25 written on sentences of the permission request mail 22. With this, a web browser (one function of control unit 32) on which the management device 30 is mounted is activated and accesses the web page for permission.

Whether step S210 is actually executed or not depends on the administrator. If the administrator who reads the permission request mail is willing to access the web page for permission, step S210 is executed and if the administrator is not willing to access the web page for permission, step S210 is not executed.

After the permission request mail is sent, whether or not the setting modification is permitted is determined based on the access to the web page for permission in the printer 10 side (step S120) and step S130 is processed when it is determined that the setting modification is permitted. The server management unit 20 functions as one web server on the network NW by cooperating with the storage unit 15. The storage unit 15 stores information (for example, HTML format file) which constitutes the web page provided by the server management unit 20. The server management unit 20 provides the web page for permission as one sort of such a web page through the network NW. In addition, the user can access the web page provided by the server management unit 20 using a browser mounted on the terminal 40 and can test various setting modifications regarding the printer 10. In addition, the server management unit 20 can directly access each of servers through the network NW and can install the latest version of firmware of the printer 10 (update the firmware).

As one example of determination methods in step S120, the server management unit 20 simply determines that the setting modification is permitted by the administrator in a case where there is access to the web page for permission after step S110 ("Yes" in step S120). That is, the administrator imparts the notice that the setting modification is permitted to the printer 10 by accessing the web page for permission when receiving the permission request mail. The server management unit 20 determines that the setting modification is not permitted in a case where the web page for permission is not accessed within a predetermined period of time after the electronic mail unit 18 sends the permission request mail ("No" in step S120) and ends the flowchart.

As another example of the determination methods in step S120, the server management unit 20 determines that the setting modification is not permitted in a case of receiving the notification not to permit the setting modification by accessing the web page. For example, "permission button" and "rejection button" which can be operated by the administrator are designed in the web page for permission. The administrator who operates the management device 30 and browses the web page for permission can arbitrarily operate (click or tap) either "permission button" or "rejection button". In this case, the server management unit 20 determines that the setting modification is permitted when receiving an operation with respect to the permission button in the web page for permission ("Yes" in step S120). On the other hand, the server management unit 20 determines that the setting modification is not permitted when receiving an operation (notification that the setting modification is not permitted) with respect to the rejection button in the web page for permission ("No" in step S120), and ends the flowchart. The server management unit 20 may determine that the setting modification is not permitted in a case where the web page for permission is not accessed within the predetermined period of time after the electronic mail unit 18 sends the permission request mail or in a case where any operation with respect to the permission button and the rejection button in the web page for permission is not received even though the web page for permission is accessed within the predetermined period of time ("No" in step S120) and may end the flowchart.

The permission request mail sent by the electronic mail unit 18 in step S110 may include the access information on the web page for rejecting the setting modification (web page for rejection) by instructing the modification. The web page for rejection is also one sort of the web page provided by the server management unit 20 through the network NW. The administrator can access the web page for permission by clicking or tapping the URL (access information) of the web page for permission written in the permission request mail and can access the web page for rejection by clicking or tapping the URL (access information) of the web page for rejection written in the permission request mail. In this case, the server management unit 20 determines that the setting modification is permitted in a case where there is access to the web page for permission ("Yes" in step S120). On the other hand, the server management unit 20 determines that the setting modification is not permitted in a case where there is access to the web page for rejection ("No" in step S120), and ends the flowchart. The server management unit 20 may determine that the setting modification is not permitted in a case where either the web page for permission or the web page for rejection is not accessed within a predetermined period of time after the electronic mail unit 18 sends the permission request mail ("No" in step S120) and may end the flowchart. In either case, when the flow chart is completed without passing through step S130 and subsequent steps from the determination of step S120, the printer 10 maintains the current setting without the modification.

The setting modification unit 19 modifies the setting according to the instruction of modification in a case where it is determined that the setting modification is permitted based on the access to such a web page for permission (step S130). That is, the setting modification unit 19 rewrites the current setting stored in the storage unit 15 according to the modification instruction received in step S100. Thereafter, the setting after the change (rewriting) is applied by control of the printer 10.

The control unit 11 may output a result of the setting modification executed by the setting modification unit 19 in step S130 (step S140), then may end the flowchart. Output mentioned above corresponds to printing onto medium to be printed or display on a screen or the like. For example, the result of the setting modification is output on the printing unit 14 as printed matter by the printing control unit 21. Alternatively, the result of the setting modification is output on the display unit 13 by the control unit 11. The printing unit 14 or the display unit 13 is one example of an output unit. The user sees such printed matter or a display in order to confirm that the setting modification is actually performed by the instruction of the modification.

Furthermore, even though "No" is determined in step S120, the control unit 11 may perform output to outside, then may end the flowchart. In this case, since the administrator's permission is not obtained, a message that the setting modification is not executed is output as printed matter to the printing unit 14 or is displayed on the display unit 13.

According to the present embodiment, the printer 10 sends the electronic mail including the access information on the web page for permission to the mail address corresponding to the administrator when the instruction of the setting modification is received. With this, the administrator can express his intention using the access to the web page for permission to permit the setting modification by the instruction of the modification and the printer 10 can avoid performing of the setting modification before obtaining the permission. As a result, it is avoided that the setting of the electronic device is modified in an unauthorized state by the administrator and security is in danger. In addition, it is possible to avoid troublesome situations that a posterior report to the setting modification is sent to the administrator as the related art and it is necessary to modify the setting again. In the present embodiment, the printer 10 modifies the setting according the instruction of the modification based on the access to the web page for permission. Accordingly, it is possible to modify the setting by receiving the clear intention of the administrator.

Furthermore, in the present embodiment, the printer 10 includes the web server (server management unit 20 and storage unit 15) which provides web pages such as the web page for permission. With this, since the electronic equipment functions as the web server which provides the web page, it is possible to easily and reliably confirm the access to the web page for permission or the like from outside.

The invention is not limited to the above-described embodiments, can implement in various types without departing from the spirit of the invention, and can adopt examples as described below. In the following, descriptions common to the items described by this time will be omitted.

Example 2

Figure 4:
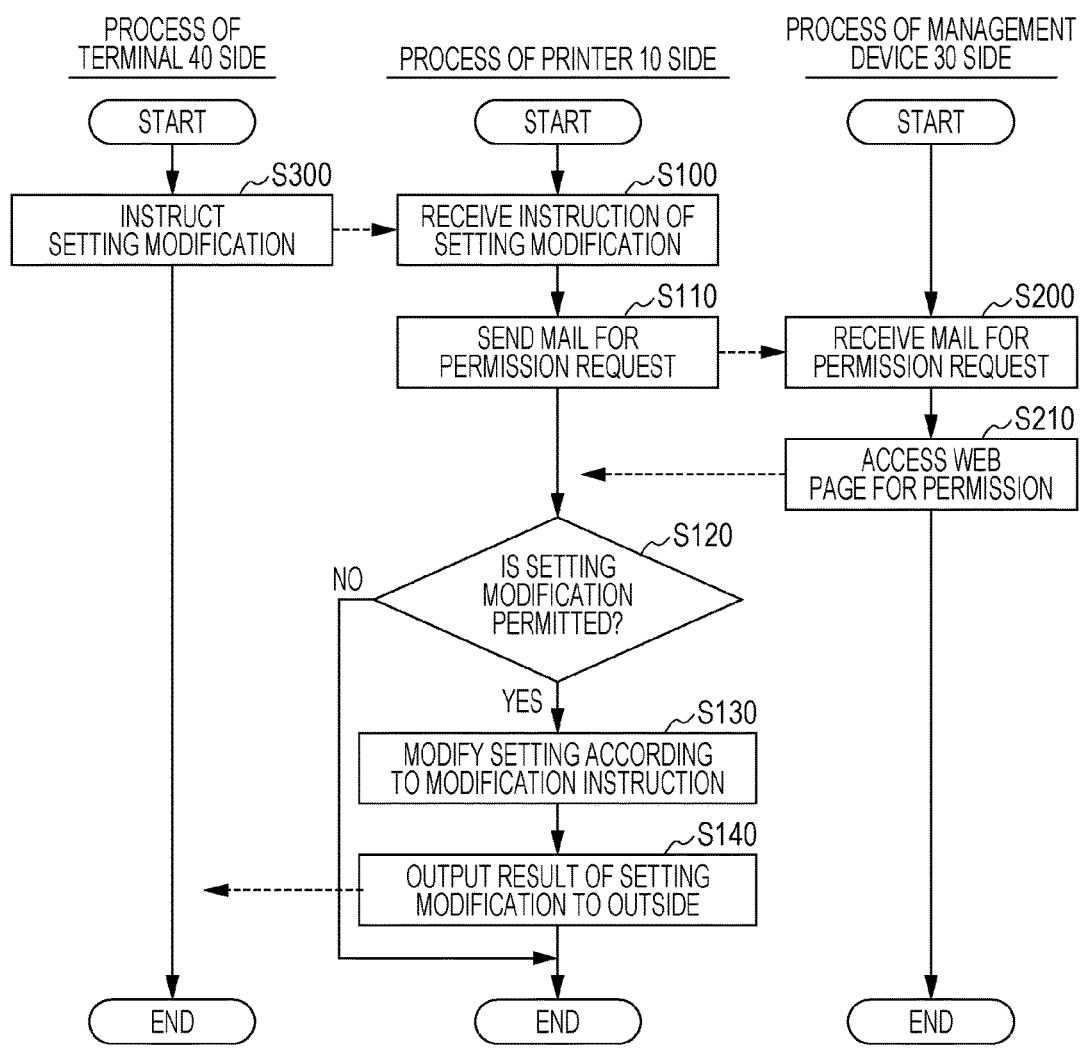
FIG. 4 is a flowchart showing a setting modification process according to Example 2.

FIG. 4 shows another example (Example 2) which is a setting modification process and is different from FIG. 2 as a flowchart. FIG. 4 shows a process executed by the printer 10, a process executed by the management device 30, and a process executed by the terminal 40 in parallel. Differences between FIG. 4 and FIG. 2 will be mainly described with reference to FIG. 4. FIG. 4 is different from FIG. 2 in that step S300 is added as a process of the terminal 40 side. The terminal 40 sends the instruction of the setting modification to the printer 10 depending on the arbitrary operation by the user (step S300). The printer 10 receives the modification instruction from the terminal 40 of such outside (step S100). A specific method for sending the modification instruction from the terminal 40 to the printer 10 is not particularly limited. The terminal 40 sends the modification instruction to the printer 10, for example, by sending the electronic mail to the mail address for the printer 10. Alternatively, the terminal 40 may activate the browser, may access the web page provided by the server management unit 20 of the printer 10, and may perform the instruction of the setting modification regarding the printer 10 according to the arbitrary operation on the web page by the user.

According to Example 2, the user can give the instruction of the setting modification in the printer 10 through the terminal 40 even if the user is at a place away from the printer 10. Furthermore, in Example 2, the printer 10 may output the result of the setting modification to the terminal 40 which is an input source of the modification instruction in step S140. For example, the electronic mail unit 18 of the printer 10 sends the electronic mail in which the result of the setting modification executed in step S130 is described to the mail address for the terminal 40. With this, the user can confirm that the setting modification is executed according to the modification instruction given to the printer 10 through the terminal 40 even if the user is at a place away from the printer 10.

Example 3

After the notification that the setting modification is not permitted is received from the management device 30, the electronic mail unit 18 of the printer 10 may delete the modification which is not permitted by the notification from a list of modifications to be permitted when sending the permission request mail in response to receiving of the modification instruction (step S100). The notification that the setting modification is not permitted precisely corresponds to an expression of user's intention that the setting modification is not permitted such as the operation of the rejection button in the web page for permission or the access to the web page for rejection or the like in detail. On the other hand, a result from passive acts of administrator such as no access to the web page within the predetermined period of time or the like does not precisely correspond to the expression of user's intention.

For example, the printer 10 receives the modification instruction for the setting of the administrator password (step S100), sends the permission request mail for requesting permission of the setting modification by the modification instruction to the mail address for the administrator (step S110), and receives the notification that the setting modification is not permitted in response to the permission request mail (determines "No" in step S120 and ends the flowchart). After this, even if the printer 10 again receives the instruction of the setting modification of the administrator password, the printer 10 does not request permission for the setting modification of the administrator password. For example, the printer 10 receives the modification instruction for the settings of the administrator password and print quality (step S100) and sends the permission request mail to the mail address for the administrator (step S110), at this time, in the sentences of the permission request mail 22 (see FIG. 3), a current setting of print quality or a setting of a modification destination thereof is written, however a current setting of the administrator password or a setting of a modification destination thereof is not written. In addition, in response to the permission request mail for requesting permission of the setting modification of print quality, only the setting of print quality is modified according to the modification instruction (step S130) in a case where the management device 30 permits the setting modification ("Yes" in step S120).

According to Example 3, in a case where the administrator precisely rejects permission of the setting modification, thereafter, unnecessary processing such as repeated request for permission for the same setting modification as the setting modification through the permission request mail can be eliminated. As a result, a burden on the administrator can be reduced.

As a further example, it is possible that the management device 30 which receives the permission request mail permits only a part of a setting modification among the setting modifications to be permitted by the permission request mail. For example, when receiving the permission request mail by operating the management device 30 (step S200) and accessing the web page for permission (step S210), the administrator can perform input to the web page for permission in order to permit only a part of a setting modification among a plurality of settings (for example, setting of source of medium to be printed, setting of administrator password, network setting, and the like) to be permitted by the permission mail. In the printer 10 side, when a process proceeds from step S120 to step S130 by receiving input, only a setting of a part of items of which the setting modification is permitted is modified according to the modification instruction. In a case of performing the modification of the setting of such the part of the items, the printer 10 performs output specifying that which settings and how the settings have been changed among the settings received the modification instruction in step S140. With this, the user can precisely recognize which instruction has been permitted and which instruction has not been permitted among the modification instructions which the user has performed.

What is claimed is:

1. Electronic equipment configured to facilitate secure equipment settings modification through use of a transmitted notification that is triggered for transmission upon detection of a request to change one or more settings of the electronic equipment, the electronic equipment comprising:
    an instruction receiving unit that receives an instruction of a setting modification regarding the electronic equipment; and
    an electronic mail sending unit that sends an electronic mail including access information to access a web page for permission of the setting modification by the modification instruction to a mail address corresponding to a predetermined administrator;
    wherein a visual arrangement of content included within the electronic mail is structured in a manner to operate as a notification regarding the setting modification, the visual arrangement being arranged in the following specific manner:
        a first list listing the one or more settings of the electronic equipment,
        a second list listing proposed modified settings for the same one or more settings of the electronic equipment, wherein the proposed modified settings included in the second list are modified in accordance with the setting modification, and
        the access information, which is provided to access the web page for permission of the setting modification, the access information being presented in a selectable form that, when selected, causes the web page to be accessed.

2. The electronic equipment according to claim 1, further comprising:
    a setting modification unit that modifies the one or more settings according to the modification instruction based on access to the web page.

3. The electronic equipment according to claim 2, wherein the setting modification unit maintains the one or more settings in a case where a notification that the setting modification is not permitted is obtained by the access to the web page.

4. The electronic equipment according to claim 2, wherein the setting modification unit maintains the one or more settings in a case where there is no access to the web page within a predetermined period of time after the electronic mail sending unit sends the electronic mail.

5. The electronic equipment according to claim 2, wherein, after the notification that the setting modification is not permitted is obtained, the electronic mail sending unit deletes the modification which is not permitted by the notification from a list of modifications to be permitted when sending the electronic mail in response to receiving of the modification instruction.

6. The electronic equipment according to claim 2, further comprising:
    an output unit that outputs a result of the setting modification by the setting modification unit.

7. The electronic equipment according to claim 2, further comprising:
    a web server that provides the web page.

8. A system configured to facilitate secure equipment settings modification through use of a transmitted notification that is triggered for transmission upon detection of a request to change one or more settings of an electronic equipment, the system comprising:
    the electronic equipment; and
    a management device for managing the electronic equipment,
    wherein the electronic equipment includes:
        an instruction receiving unit that receives an instruction of a setting modification regarding the electronic equipment; and
        an electronic mail sending unit that sends an electronic mail including access information to access a web page for permission of the setting modification by the modification instruction to a mail address corresponding to a predetermined administrator;
    wherein the management device includes:
        an electronic mail receiving unit that receives the electronic mail; and
        a control unit that accesses the web page based on the access information included in the electronic mail, and
    wherein a visual arrangement of content included within the electronic mail is structured in a manner to operate as a notification regarding the setting modification, the visual arrangement being arranged in the following specific manner:
        a first list listing the one or more settings of the electronic equipment,
        a second list listing proposed modified settings for the same one or more settings of the electronic equipment, wherein the proposed modified settings included in the second list are modified in accordance with the setting modification, and
        the access information, which is provided to access the web page for permission of the setting modification, the access information being presented in a selectable form that, when selected, accesses the web page.

9. A method that is executed by electronic equipment to facilitate secure equipment modification through use of a transmitted notification that is triggered for transmission upon detection of a request to change one or more settings of the electronic equipment, the method comprising:
   receiving an instruction of a setting modification regarding the electronic equipment; and
   sending an electronic mail including access information to access a web page for permission of the setting modification by the modification instruction to a mail address corresponding to a predetermined administrator;
wherein a visual arrangement of content included within the electronic mail is structured in a manner to operate as a notification regarding the setting modification, the visual arrangement being arranged in the following specific manner:
   a first list listing the one or more settings of the electronic equipment,
   a second list listing proposed modified settings for the same one or more settings of the electronic equipment, wherein the proposed modified settings included in the second list are modified in accordance with the setting modification, and
   the access information, which is provided to access the web page for permission of the setting modification, the access information being presented in a selectable form that, when selected, accesses the web page.

* * * * *